United States Patent
Marleau, Jr. et al.

(10) Patent No.: US 9,889,723 B2
(45) Date of Patent: Feb. 13, 2018

(54) ACTIVE PRESSURE RELIEF VALVE FOR AUTOMATIC AIR EXTRACTOR

(75) Inventors: James A. Marleau, Jr., Canton, MI (US); David A. Wade, Plymouth, MI (US); Kenneth M. Reo, Macomb, MI (US); Todd W. Dishman, West Bloomfield, MI (US); Azfar Qamar, Plymouth, MI (US); Paul Repp, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1604 days.

(21) Appl. No.: 13/235,779

(22) Filed: Sep. 19, 2011

(65) Prior Publication Data

US 2013/0072101 A1   Mar. 21, 2013

(51) Int. Cl.
*B60H 1/24* (2006.01)

(52) U.S. Cl.
CPC ............. *B60H 1/249* (2013.01); *B60H 1/248* (2013.01)

(58) Field of Classification Search
CPC .................................. B60H 1/248; B60H 1/249
USPC ........................................ 454/70, 143, 162
See application file for complete search history.

(56) References Cited

U.S. PATENT DOCUMENTS

| | | | |
|---|---|---|---|
| 3,392,654 A * | 7/1968 | Grenier | 454/75 |
| 4,942,806 A * | 7/1990 | Hwang | 454/162 |
| 5,120,271 A | 6/1992 | Shtanko | |
| 5,391,111 A * | 2/1995 | Girard et al. | 454/70 |
| 5,695,397 A | 12/1997 | Frank et al. | |
| 5,759,097 A * | 6/1998 | Bernoville et al. | 454/162 |
| 6,086,474 A * | 7/2000 | Dohring | 454/143 |
| 6,209,331 B1 * | 4/2001 | Lake et al. | 62/180 |
| 6,273,127 B1 | 8/2001 | Wade | |
| 6,497,275 B1 * | 12/2002 | Elliot | 165/204 |
| 6,685,099 B2 * | 2/2004 | Rutyna et al. | 236/49.3 |
| 7,204,472 B2 | 4/2007 | Jones et al. | |
| 7,410,415 B2 * | 8/2008 | Ronnlund et al. | 454/162 |
| 7,877,180 B2 * | 1/2011 | Turner et al. | 701/49 |
| 7,974,755 B2 * | 7/2011 | Campbell et al. | 701/49 |
| 8,029,343 B2 * | 10/2011 | Major et al. | 454/70 |
| 2004/0259493 A1 | 12/2004 | Valley et al. | |

(Continued)

FOREIGN PATENT DOCUMENTS

GB   1237116   6/1971

*Primary Examiner* — Gregory Huson
*Assistant Examiner* — Dana Tighe
(74) *Attorney, Agent, or Firm* — Vichit Chea; MacMillan, Sobanski & Todd, LLC

(57) ABSTRACT

A passenger vehicle comprises a passenger compartment with an interior space. An HVAC system conditions fresh air from outside the vehicle, wherein the HVAC system includes a main blower for delivering conditioned air to the interior space. An air extractor valve is fluidically coupled between the interior space and the outside, wherein the air extractor valve opens in response to a higher pressure in the interior space than an outside pressure. The air extractor valve substantially blocks air flow from the outside to the interior space. A supplemental blower is integrated with the air extractor valve for directing an exhaust flow from the interior to the outside, wherein the supplemental blower is activated as a function of the main blower. Alternatively, the supplemental blower is activated in response to a door being opened, enhancing the ability of the extractor to reduce door closing effort.

16 Claims, 2 Drawing Sheets

(56) References Cited

U.S. PATENT DOCUMENTS

| | | |
|---|---|---|
| 2007/0066207 A1 | 3/2007 | Smith et al. |
| 2008/0113600 A1* | 5/2008 | Kim .............................. 454/105 |
| 2008/0306660 A1* | 12/2008 | Campbell et al. ............. 701/49 |
| 2009/0068940 A1* | 3/2009 | Bloemeling et al. ......... 454/162 |
| 2009/0088065 A1* | 4/2009 | Mouch et al. ................ 454/164 |
| 2010/0216384 A1* | 8/2010 | McCarthy et al. ............. 454/70 |

\* cited by examiner

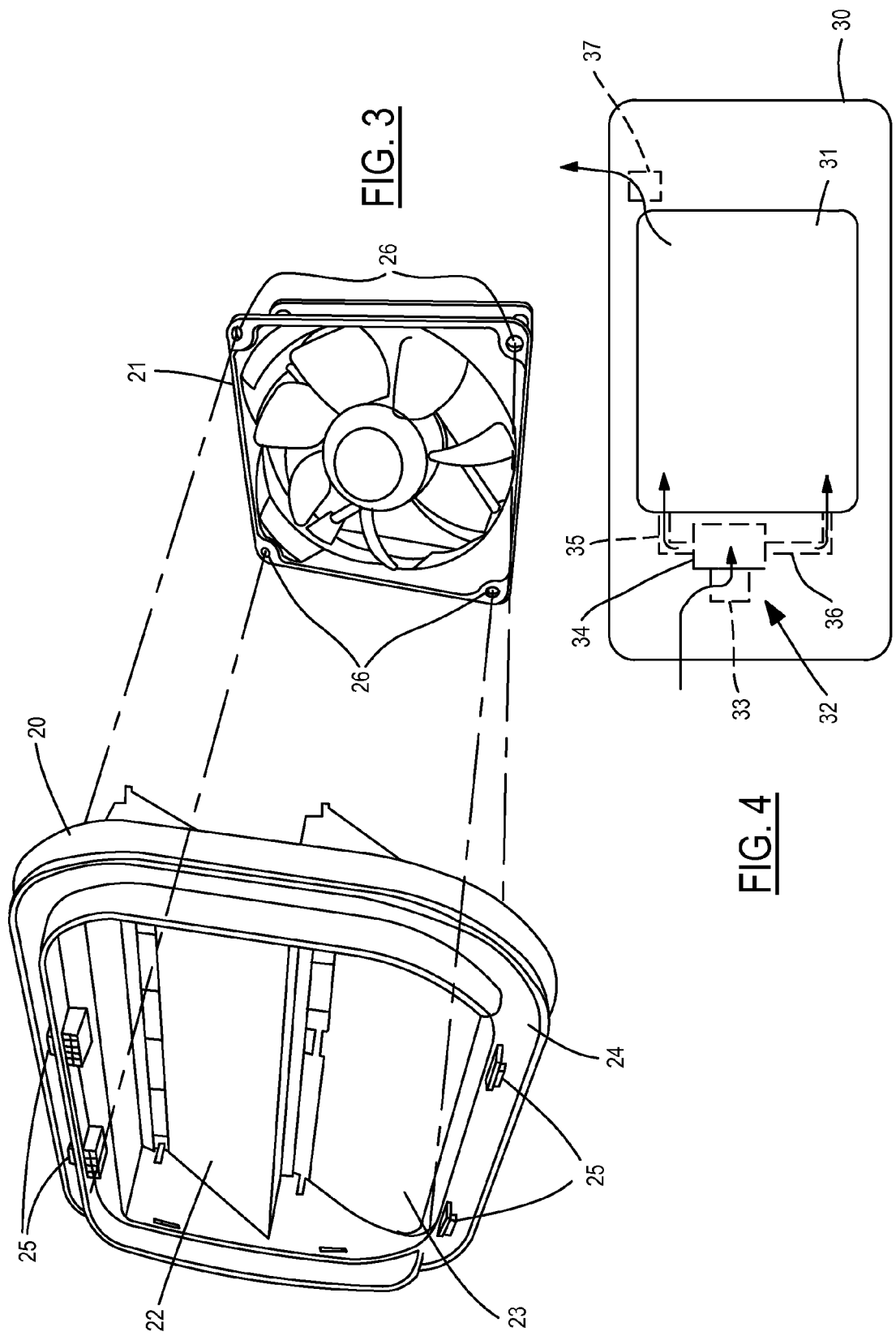

ACTIVE PRESSURE RELIEF VALVE FOR AUTOMATIC AIR EXTRACTOR

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to ventilation of passenger vehicles, and, more specifically, to a pressure relief valve assembly for extracting air from a vehicular passenger compartment.

To obtain a quiet environment and to protect the interior passenger compartment of an automotive vehicle from outside elements, the compartment is substantially sealed from the atmosphere. During certain vehicle operating conditions, however, air pressure in the interior passenger compartment may exceed atmospheric pressure. This condition occurs routinely when a vehicle door is closed when entering or exiting the vehicle. If the interior is not vented to the atmosphere, the effort required to close the door may greatly increase, inconveniencing the operator of the vehicle. High internal pressures can also be created by operation of a blower in a climate control system or by the inrush of outside air when traveling at high speeds.

It is well known to provide a mechanism for equalizing the pressure between the interior compartment of an automobile and the atmosphere. Typically, a valve assembly is placed between the interior space and the outside of the vehicle in order to control an exhaust flow of air from the interior. One type of valve assembly known as a pressure relief valve or "air extractor" is typically connected, by way of one or more ducts, conduits, and/or vents, to the passenger compartment. The valve assembly allows air to be selectively expelled, discharged, or extracted from the vehicle passenger compartment, while substantially preventing air, gas, fumes, and/or other undesirable materials from entering into the passenger compartment. By eliminating and/or substantially reducing the pressure differentials, these pressure relief valve assemblies improve the performance of climate control systems, reduce door-closing efforts, minimize window frame deflection, and reduce noise within the passenger compartment of the vehicle.

A typical vehicle body air extractor is a passive valve that only permits air flow from a higher pressure vehicle interior to a lower pressure vehicle exterior. The aerodynamics of each particular vehicle affects the pressure appearing at various speeds at various locations along a vehicle exterior surface where the output of the air extractor valve may be mounted. The resulting pressures may limit the acceptable locations on the vehicle where the air extractor valve can be placed. In addition, heating, ventilation, air conditioning (HVAC) systems have required a sufficiently large main blower in order to produce sufficient air flow that will overcome air flow losses and exterior pressures to ensure a sufficient extraction of air from the vehicle interior space. However, as the main blower increases in size, an undesirable noise level may be produced by the blower.

In order to achieve a desired level for the door closing effort, a minimum size (i.e., flow area) has been required for the air extractor. An increase in air handling efficiency would be desirable since the overall size of the air extractor could be reduced.

SUMMARY OF THE INVENTION

By integrating a fan or blower with the air extractor valve, the present invention creates an active vent valve. By being less dependent upon the existence of a lower pressure at the exterior vehicle surface, the active vent increases the number of acceptable placements on the vehicle exterior despite the aerodynamics of the vehicle. When the active vent is controlled in conjunction with opening of a vehicle door, the ability of the air extractor to reduce the door closing effort is enhanced. By increasing the throughput of the air extractor, it may be possible to reduce the size of the air extractor, thereby reducing its cost. When the active vent is controlled in conjunction with the HVAC blower, a smaller, less noisy main HVAC blower can be used without degrading HVAC performance.

In one aspect of the invention, a passenger vehicle comprises a passenger compartment with an interior space. A passenger door is provided for opening to allow ingress into and egress from the passenger compartment. A sensor is arranged in the vehicle to sense an opened state or closed state of the passenger door. An air extractor valve is fluidically coupled between the interior space and the outside, wherein the air extractor valve opens in response to a higher pressure in the interior space than an outside pressure, and wherein the air extractor valve substantially blocks air flow from the outside to the interior space. A supplemental blower is integrated with the air extractor valve for directing an exhaust flow from the interior space to the outside. The supplemental blower is activated in response to sensing the open state of the passenger door.

In another aspect of the invention, a passenger vehicle comprises a passenger compartment with an interior space. An HVAC system conditions fresh air from the outside of the vehicle, wherein the HVAC system includes a main blower for delivering a flow of conditioned air to the interior space. An air extractor valve is fluidically coupled between the interior space and the outside, wherein the air extractor valve opens in response to a higher pressure in the interior space than an outside pressure. The air extractor valve substantially blocks air flow from the outside to the interior space. A supplemental blower is integrated with the air extractor valve for directing an exhaust flow from the interior space to the outside, wherein the supplemental blower is activated as a function of the main blower.

BRIEF DESCRIPTION OF THE DRAWINGS

FIG. 3 is an exploded, perspective view of an active vent valve of the present invention.

FIG. 4 is a diagram showing an improved air flow pattern through an interior space.

DETAILED DESCRIPTION OF PREFERRED EMBODIMENTS

Figure 1:
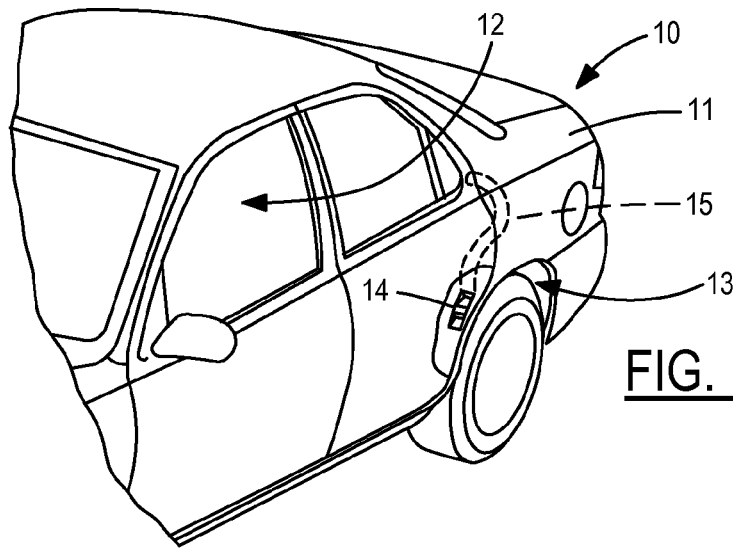
FIG. 1 is a partial, perspective view of a vehicle having an air extractor valve.

Referring now to FIG. 1, an automotive vehicle 10 is illustrated as including a body 11 having various surfaces.

Body 11 surrounds a passenger compartment 12. Fluid communication between passenger compartment 12 and an external atmosphere is provided by an air extractor valve 14 located in a wheel well area 13 of vehicle 10. Air extractor valve 14 may preferably be coupled to passenger compartment 12 via a duct 15 as is known in the art.

Figure 2:
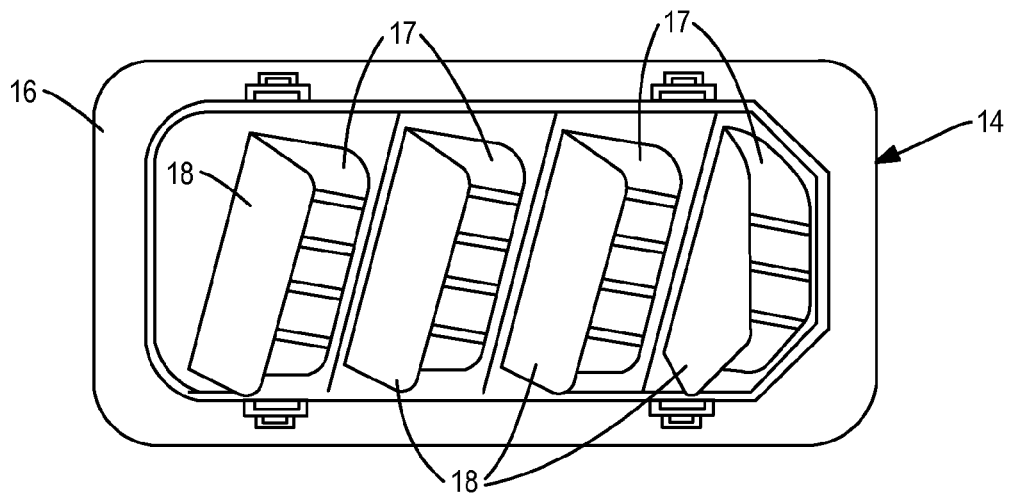
FIG. 2 is a plan view of a conventional air extractor valve.

FIG. 2 shows air extractor valve 14 in greater detail. A main body 16 includes a plurality of grated apertures 17, each having an associated movable flap 18 (shown in an open position) which allows one-way air flow from the vehicle interior space to the exterior. Flaps 18 are arranged such that when a predetermined higher pressure is not present on the interior side of valve 14, then the weight of flaps 18 forces them to close (i.e., by pivoting to a position that blocks apertures 17).

FIG. 3 shows a first embodiment of the invention wherein an air extractor valve 20 is integrated with a supplemental blower 21. Air extractor valve 20 has flaps 22 and 23 pivotally mounted with respect to underlying apertures (not shown). A flange 24 and clips 25 facilitate mounting of air extractor valve 20 to an appropriate aperture in a surface of the vehicle body. Supplemental blower 21 is integrated with valve 20 by attaching it to the rear, interior side of valve 20 using attachment holes 26 and corresponding fasteners (not shown). Supplemental blower 21 includes an electric drive motor and fan blades similar to the types of fans conventionally used to cool desktop personal computers, for example. Supplemental blower 21 is mounted such that it does not interfere with the flap movements or other functioning of air extractor valve 20. When blower 21 is off, valve 20 can still open in response to a higher pressure in the interior space than an outside pressure (e.g., when a vehicle door is closed). The mounting of supplemental blower 21 is also done in a manner that avoids interfering with the ability of air extractor valve 20 to substantially block air flow from the outside to the interior space.

In one embodiment described below, supplemental blower 21 is activated as a function of the main blower activation in order to direct an exhaust flow from the interior space to the outside. In a preferred embodiment, the supplemental blower and the main blower each has a respective variable speed. The speed of the supplemental blower may be preferably controlled in proportion to a speed that is set for the main blower. Under some circumstances such as an especially aggressive warm-up or cool-down of the passenger cabin, some mapping other than a directly proportional mapping between the main blower and supplemental blower speeds may be used.

The resulting supplemental air flow is shown in FIG. 4. Vehicle 30 has a passenger compartment 31 and an HVAC system 32. HVAC 32 has a conditioning section 33 and a main blower 34. Outside air is conditioned by conditioning section 33, and the conditioned air is distributed by main blower 34 through ducts 35 and 36 into passenger compartment 31. An amount of air from within passenger compartment 31 may be recirculated and mixed with the outside air by HVAC 32. Air is exhausted from passenger compartment 31 through active vent valve 37 to the vehicle exterior.

Figure 5:
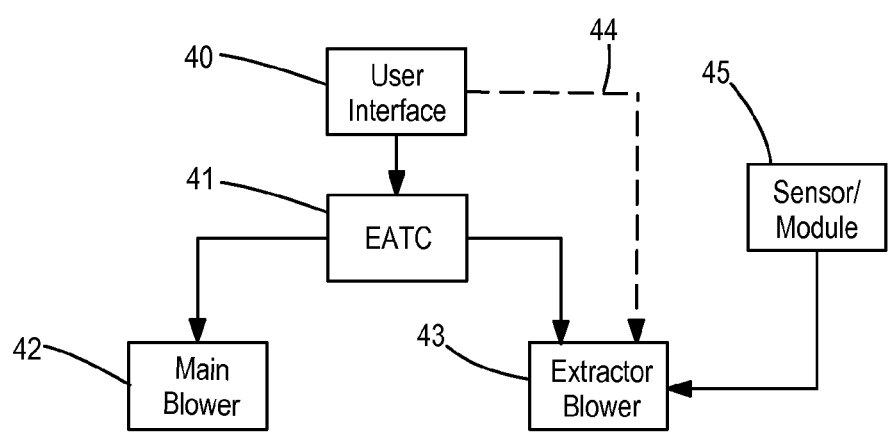
FIG. 5 is a block diagram of a vehicular system for controlling the active vent.

FIG. 5 shows a user interface 40 coupled to an electronic automatic temperature control (EATC) 41. After a user manually selects a target temperature using the user interface 40, EATC 41 activates the HVAC system as necessary to achieve the target temperature within the passenger compartment. Control of the HVAC system includes automatically setting an appropriate speed for main blower 42. In one preferred embodiment, EATC 41 activates supplemental extractor blower 43 in proportion to the automatically determined speed that has been set for main blower 42. For example, main blower 42 and supplemental blower 43 may have respective low, medium, and high speed settings, and they are both operated on the same setting when the HVAC is active. Alternatively, a greater number of speed settings may be provided and/or these speeds may be controlled continuously.

As shown by dashed line 44, user interface 40 may also directly control the speed set for supplemental extractor blower 43 (whether or not an EATC is present). Preferably, a single blower speed control switch is provided which sets the speeds for both blowers 42 and 43 in tandem.

In another embodiment of the invention, supplemental blower 43 is controlled in response to the opening of a door such as a passenger door or a liftgate. As shown in FIG. 5, one or more door sensors and/or a related electronic module 45 is coupled to supplemental blower 43 for the purpose of activating it in response to the opening of a door. Supplemental blower 43 continues to run when the door is subsequently closed so that interior air escapes through the air extractor valve more quickly, thereby reducing the effort required to close the door. Supplemental blower 43 is deactivated in response to sensing that the closed state of the door is restored (either immediately or after a brief delay such as 2 seconds). The blower speed may be ramped down gradually in order to make the operation of supplemental blower 43 less noticeable. To avoid a long duration of blower operation and any associated battery drain, supplemental blower 43 may also be deactivated after a fixed time interval has elapsed since it was activated (e.g., 30 seconds).

What is claimed is:

1. A passenger vehicle comprising:
   a passenger compartment with an interior space;
   a passenger door for opening to allow ingress into and egress from the passenger compartment;
   a sensor in the vehicle arranged to sense an opened state or closed state of the passenger door;
   an air extractor valve fluidically coupled between the interior space and the outside, wherein the air extractor valve opens in response to a higher pressure in the interior space than an outside pressure, and wherein the air extractor valve substantially blocks air flow from the outside to the interior space; and
   a supplemental blower integrated with the air extractor valve for directing an exhaust flow from the interior space through the air extractor valve to the outside, wherein the supplemental blower is activated in response to sensing the open state of the passenger door.

2. The vehicle of claim 1 wherein the supplemental blower is deactivated in response to sensing that the closed state is restored.

3. The vehicle of claim 1 wherein the supplemental blower is deactivated after a fixed time interval has elapsed since it was activated.

4. A passenger vehicle comprising:
   a passenger compartment with an interior space;
   an HVAC system for conditioning fresh air from the outside of the vehicle, wherein the HVAC system includes a main blower for delivering a flow of conditioned air to the interior space;
   an air extractor valve fluidically coupled between the interior space and the outside, wherein the air extractor valve opens in response to a higher pressure in the interior space than an outside pressure, and wherein the air extractor valve substantially blocks air flow from the outside to the interior space; and a supplemental blower integrated with the air extractor valve for directing an exhaust flow from the interior space through the air extractor valve to the outside, wherein the supplemental blower is activated as a function of the main blower.

5. The vehicle of claim 4 wherein the supplemental blower and the main blower each has a variable speed, and wherein the speed of the supplemental blower is controlled in proportion to a speed that is set for the main blower.

6. The vehicle of claim 5 further comprising a user interface for manually selecting the speed set for the main blower.

7. The vehicle of claim 5 further comprising a user interface for manually selecting a target temperature, wherein the HVAC system includes an electronic automatic temperature control for automatically determining the speed set for the main blower in response to the selected target temperature, and wherein the electronic automatic temperature control activates the supplemental blower in proportion to the automatically determined speed set for the main blower.

8. The vehicle of claim 4 wherein the supplemental blower is fluidically connected between the air extractor valve and the interior space.

9. The vehicle of claim 8 wherein the integrated supplemental blower and air extractor valve are located outside of the interior space, and wherein the vehicle further comprises a duct coupled between the supplemental blower and the interior space.

10. An active vent for a passenger vehicle wherein the vehicle has a passenger compartment with an interior space, wherein the vehicle has an HVAC system for conditioning fresh air from the outside of the vehicle, wherein the HVAC system includes a main blower for delivering a flow of conditioned air to the interior space, the active vent comprising;
    an air extractor valve for fluidically coupling between the interior space and the outside, wherein the air extractor valve opens in response to a higher pressure in the interior space than an outside pressure, and wherein the air extractor valve substantially blocks air flow from the outside to the interior space; and
    a supplemental blower integrated with the air extractor valve for directing an exhaust flow from the interior space through the air extractor valve to the outside, wherein the supplemental blower is activated as a function of the main blower.

11. The active vent of claim 10 wherein the supplemental blower has a variable speed, and wherein the speed of the supplemental blower is controlled in proportion to a speed that is set for the main blower.

12. A method of operating a supplemental fan for a passenger vehicle, wherein the vehicle includes a passenger compartment with an interior space, a door for opening to allow access into the passenger compartment, a sensor in the vehicle arranged to sense an opened state or closed state of the door, an air extractor valve fluidically coupled between the interior space and the outside, and a supplemental blower integrated with the air extractor valve, the method comprising the steps of:
    sensing opening of the door;
    activating the supplemental blower in response to opening of the door for directing air flow from the interior space through the air extractor valve to the outside to reduce closing effort when the door is closed.

13. The method of claim 12 further comprising the step of:
    deactivating the supplemental blower in response to sensing that the closed state is restored.

14. The method of claim 12 further comprising the step of:
    deactivating the supplemental blower after a fixed time interval has elapsed since it was activated.

15. A method of operating a supplemental fan for a passenger vehicle, wherein the vehicle includes a passenger compartment with an interior space, an HVAC system for conditioning fresh air from the outside of the vehicle, and an air extractor valve fluidically coupled between the interior space and the outside, wherein the HVAC system includes a main blower for delivering a flow of conditioned air to the interior space, the method comprising the steps of:
    opening the air extractor valve automatically in response to a higher pressure in the interior space than an outside pressure;
    substantially blocking air flow from the outside to the interior space through the air extractor valve; and
    directing an exhaust flow from the interior space through the air extractor valve to the outside by a supplemental blower integrated with the air extractor valve, wherein the supplemental blower is activated as a function of the main blower.

16. The method of claim 15 wherein the supplemental blower and the main blower each has a variable speed, the method further comprising the step of:
    setting a speed for the main blower;
    wherein the step of activating the supplemental blower as a function of the main blower is comprised of controlling the speed of the supplemental blower in proportion to the speed set for the main blower.

* * * * *